United States Patent [19]

Kharas

[11] Patent Number: 5,389,589
[45] Date of Patent: Feb. 14, 1995

[54] BARIUM-CONTAINING ALUMINA

[75] Inventor: Karl C. C. Kharas, Des Plaines, Ill.

[73] Assignee: Allied-Signal Inc., Morris Township, Morris County, N.J.

[21] Appl. No.: 994,838

[22] Filed: Dec. 22, 1992

[51] Int. Cl.$^6$ .............................................. C04B 35/10
[52] U.S. Cl. .................................. 501/127; 501/153; 423/625; 252/315.7
[58] Field of Search ................. 501/127, 153, 12; 423/625; 502/341, 355; 252/315.7

[56] References Cited

U.S. PATENT DOCUMENTS

| | | | |
|---|---|---|---|
| 4,031,177 | 6/1977 | Auriol et al. | 501/153 |
| 4,332,913 | 6/1982 | Bock | 501/153 |
| 4,495,302 | 1/1985 | Taylor et al. | 501/153 |
| 4,582,813 | 4/1986 | Kanda et al. | 501/153 |

OTHER PUBLICATIONS

Azaroff et al, *The Powder Method in X-Ray Crystallography*, pp. 10–11; 1958 (no month).
Cullity, *Elements of Materials Science and Engineering*, pp. 397–406, 1978, (no month).
Van Vlack, *Elements of Materials Science and Engineering*, pp. 95–98, Jun. 1980.
Mizukami et al., *CAPoC2 Proc. Second Int'l Sympos*, 557–568 (1991) (no month).
Repelin et al., *Mat. Res. Bull.*, 25, 611–621 (1990) (no month).
Machida et al. *Chem. Lett.*, Chem. Soc. Jap., 151–154 (1986) no month.
Machida et al., *Chem. Lett.*, Chem. Soc. Jap., 767–770 (1987) no month.
Machida et al., *Bull. Chem. Soc. Jpn.*, 61, 3659–3665 (1988) no month.

*Primary Examiner*—Anthony Green
*Attorney, Agent, or Firm*—Mary Jo Boldingh; Harold N. Wells; Roger H. Criss

[57] ABSTRACT

The present invention is a barium-containing alumina with the X-ray pattern of the FIGURE. The alumina may be synthesized by simultaneously adding a polyether or a polyalcohol and an aqueous solution of a water soluble barium carboxylate to an aqueous boehmite sol or suspension to form a gel, the gel having a polyether or polyalcohol content of about 2 wt. % to about 26 wt. %, preferably about 10 wt. % to about 20 wt. %. The gel is then dried and calcined to convert it to an essentially pure barium-containing delta alumina. The alumina may be optionally hydrothermally treated to induce further crystallization. The final product contains about 2 wt. % to about 18 wt. % Ba, preferably about 8 wt. % to about 12 wt. %.

15 Claims, 1 Drawing Sheet

1

BARIUM-CONTAINING ALUMINA

BACKGROUND OF THE INVENTION

This invention relates to a durable catalyst support; in particular, it relates to a support for catalytic processes involving very high temperatures, e.g., automotive catalysts.

Catalyst supports are usually metal oxides which are generally not very durable at high temperatures, especially in the presence of water/steam. These supports tend to form large crystallites resulting in a lower surface area and possibly enveloping catalytic metals and aiding the metals in sintering. Phase transitions of metastable phases such as gamma alumina can occur under forcing conditions (e.g., high temperature, steam), resulting in inferior catalyst support performance. Thermal and/or hydrothermal stability are believed to be important characteristics for a catalyst support in order to attain highly durable performance in automotive emissions control or other catalytic processes that involve temperatures in excess of 800° C.

It is an object of the present invention to provide a catalyst support having good thermal and hydrothermal stability.

SUMMARY OF THE INVENTION

The object of the present invention is provided by a barium-containing alumina with the X-ray pattern of the FIGURE. The alumina may be synthesized by simultaneously adding a polyether or a polyalcohol and an aqueous solution of a water soluble barium carboxylate to an aqueous boehmite sol or suspension to form a gel said gel having a polyether or polyalcohol content of about 2 wt. % to about 26 wt. %, preferably about 10 wt. % to about 20 wt. %. The gel is then dried and calcined to convert it to an essentially pure phase of delta alumina as determined by x-ray diffraction. The alumina may be optionally hydrothermally treated to induce further crystallization. The final product contains about 2 wt. % to about 18 wt. % Ba, preferably about 8 wt. % to about 12 wt. %.

BRIEF DESCRIPTION OF THE DRAWING

The FIGURE is an X-ray diffraction pattern of a barium-containing alumina of the instant invention.

DESCRIPTION OF THE INVENTION

Figure 1:
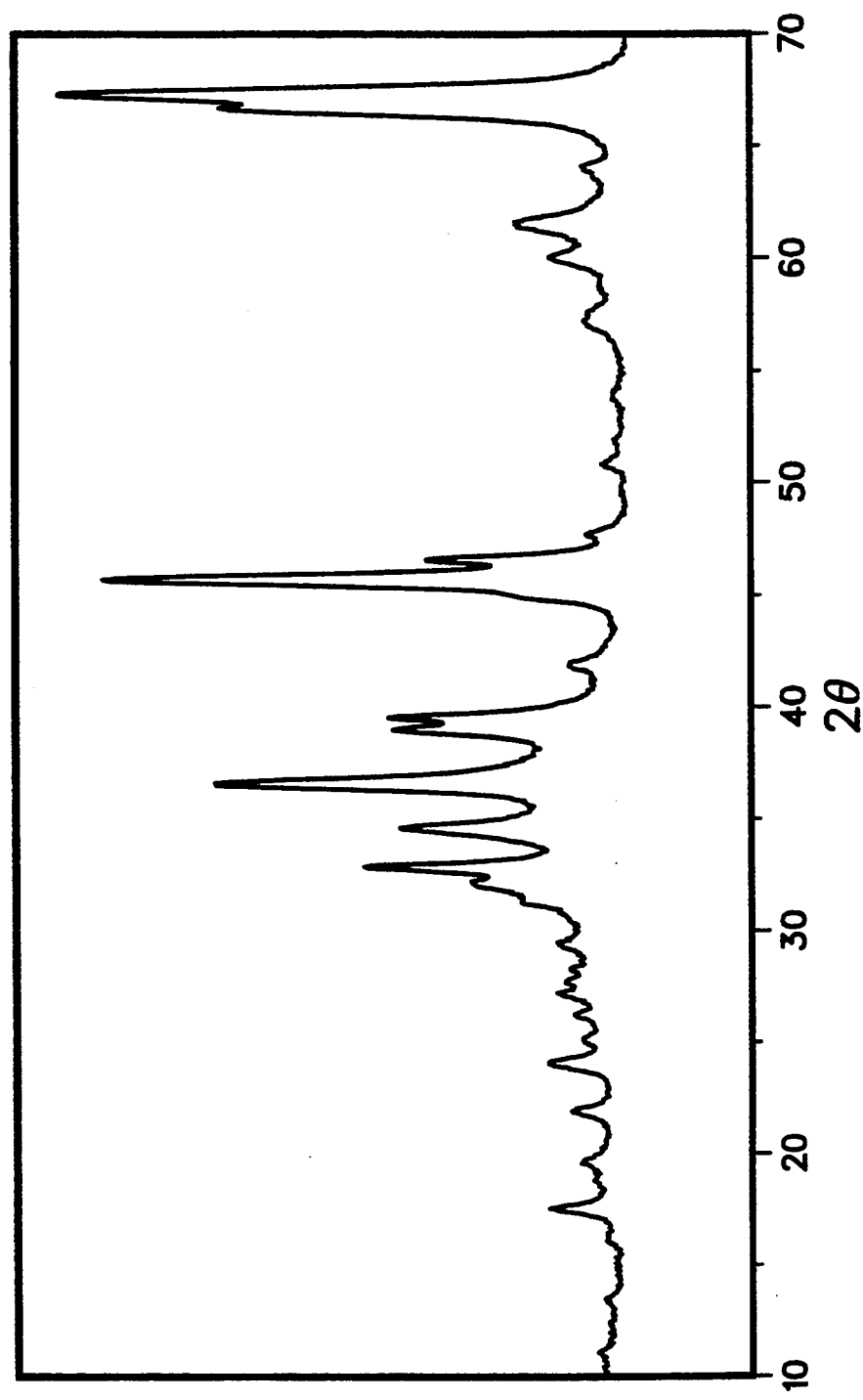

The barium-containing alumina support of the instant invention comprises a material having the X-ray pattern of the FIGURE, the listing of which appears in Table 2. The essential peaks appear in Table 3.

The alumina appears to be a delta alumina. X-ray diffraction patterns for delta alumina are available for comparison. Delta alumina is defined to be one intermediate phase out of several along the transformation pathway between boehmite (which is one structure of AlOOH) and alpha alumina. The transformation series is:

boehmite→γ-$Al_2O_3$δ-$Al_2O_3$→θ-$Al_2O_3$→α-$Al_2O_3$

Delta alumina is considered to be unstable with respect to theta alumina. The transformation typically occurs at temperatures between 850° C. and 1050° C.

The barium-containing alumina may be prepared by a novel aqueous sol-gel procedure comprising the steps of:

(a) making three preparations:
  (i) an aqueous solution of a water soluble barium carboxylate having a concentration suitable to provide about 2 wt. % to about 18 wt. % Ba in the alumina, preferably between about 8 wt. % and about 12 wt. %;
  (ii) a polyether or a polyalcohol; and
  (iii) an aqueous boehmite sol or suspension having crystallites greater than about 150 Å, preferably between about 175 Å and about 250 Å;
(b) simultaneously adding preparations (a)(i) and (a)(ii) to preparation (a)(iii) with stirring to form a gel, said gel having a polyether or polyalcohol content of about 2 wt. % to about 26 wt. %, preferably about 10 wt. % to about 20 wt. %;
(c) drying the gel and then calcining it in air at a temperature greater than about 1000° C., preferably between about 1050° C. and 1175° C. to form the alumina; and
(d) optionally further crystallizing the alumina by treating it at a temperature in the range of from about 1000° C. to about 1350° C., preferably between about 1100° C. and 1200° C., in an atmosphere containing 3 to about 30% steam, preferably about 10% steam.

The water soluble barium carboxylate may be chosen from the group consisting of barium acetate and barium propionate. Other water soluble barium carboxylates may also be used. The polyether may be chosen from the group consisting of a polyethylene glycol, diethylene glycol monobutyl ether, and the crown ethers 1,4,7,10,13,16-hexaoxacyclooctadecane ("18-crown-6"), 1,4,7,10,13-pentaoxacyclopentadecane ("15-crown-5"), and 1,4,7,10,13,16,19-heptaoxacycloheneicosane ("21-crown-7") and the polyalcohol may be chosen from the group consisting of sorbitol and sucrose.

The optional additional hydrothermal treatment of step (d) may be done to induce a further crystallization of the alumina.

This unique barium-containing delta alumina is very stable, i.e., at temperatures up to about 1300° C. the alumina will retain the delta form with the formation of only a small amount of theta alumina even in the presence of 10% steam. No alpha alumina was detected. The barium-containing delta alumina contains barium but typically appears to be solely alumina when examined by X-ray diffraction, although small amounts of $BaCO_3$ sometimes occur.

It is frequently desirable to maximize the surface area of a catalyst support. Maximizing the surface area is possible with this invention by using a boehmite having a small crystallite size, i.e., from about 175 Å to about 250 Å. The size necessary to permit the nucleation of the barium-containing delta alumina appears to be greater than about 140 Å. However, if supports which are extremely resistant to phase transformation or loss of surface area are required, boehmites having larger crystallite sizes, i.e., greater than 300 Å, may be used with a resultant decrease in surface area.

EXAMPLE I

Synthesis of Barium-Containing Alumina

The barium-containing alumina was prepared as follows: Barium acetate (1.98 g) dissolved in 12.82 g deionized water and 50.67 g polyethylene glycol (molecular weight =400 g/mol) were placed in separate beakers and added simultaneously with stirring to a third beaker containing 250 mL Vista Dispal 11N7-12 boehmite sol (12 wt. % alumina; 208 Å crystallites). A gel immediately formed. The gel was then dried on an evaporating dish in a drying oven at 120° C then calcined for 6 hours at 1000° C. The yield was approximately 30 g alumina. The mole ratios of the components were: 1804 mol $H_2O$, 81.6 mol AlOOH, 16.4 mol polyethylene glycol, 1.0 mol barium acetate.

Hydrothermal Treatment

Samples of the alumina were treated at 1140° C. in an atmosphere containing 10% steam for 6 hours. This material exhibits an X-ray diffraction powder pattern essentially identical to that provided in the FIGURE.

EXAMPLE II

Determination of Alumina Phase

The barium-containing alumina of this invention was determined to be a delta alumina as follows. A gel was prepared as in Example I and was separated into portions. One portion was dried at 120° C. and calcined for 6 hours at 600° C. instead of at 1000° C. The product was characterized by X-ray diffraction and the only phase detected was gamma alumina. Gamma alumina was also the only phase detected for portions calcined at 700° C. and 800° C.

Two portions were calcined at 1000° C., one in air and the other with 10% steam in air. The diffraction pattern for both portions appear to be relatively poorly crystalline delta alumina along with gamma alumina. The presence of steam does not appear to affect the alumina. After calcination at 1100° C. in 10% steam in air, a sample of the barium-containing delta alumina appears to be essentially pure delta alumina. Samples of the delta alumina were also calcined in 10% steam in air at 1200° C., 1250° C., and 1300° C. and clearly contained small amounts of theta alumina. The samples treated at 1300° C. or less, however, appear to contain no alpha alumina, indicating that the barium-containing alumina of this invention is an unusually thermally stable transitional alumina.

EXAMPLE III

Surface Area Determination

Another batch of barium-containing alumina was synthesized using the same components and mole ratios of components as in Example I and the surface area of the fresh and thermally and hydrothermally treated alumina was measured by the BET method with nitrogen. The surface areas of samples treated at different temperatures as in Example II and as well as in 10% steam appears in Table 1. No decrease in surface area was detected for the samples treated at 1140° C. and only an 11% decrease was detected for samples aged at 1250° C. It is significant that even after treatment in steam, the barium-containing alumina determined to be delta alumina in Example II still retains phase stability and relatively high surface area. Others have reported the instability of delta alumina after hydrothermal treatment, Hrabe et al., J. Mater. Res, 7, 444–449 (1992).

TABLE 1

| Temperature, °C. | Surface Area (m²/g) | |
|---|---|---|
| | Calcined in air | Calcined in air, 10% steam |
| 600 | 94 | |
| 800 | 75 | |
| 1000 | 53 | |
| 1100 | | 55 |
| 1140 | | 55 |
| 1250 | | 47 |

EXAMPLE IV

X-ray Diffraction

A barium-containing alumina was prepared as in Example I using the same components and mole ratios of components except that a powdered Condea boehmite (Pural 400) suspended in water was used instead of Vista Dispal sol. The alumina was hydrothermally treated (1140° C., 10% steam) and then characterized by X-ray powder diffraction with CuKα radiation. The powder pattern appears in the FIGURE, and the listing appears in Table 2 alongside the listing for $\delta\text{-}Al_2O_3$ (JCPDS (Joint Committee on Powder Diffraction Standards) file #16-394). The essential peaks of the barium-containing alumina appear in Table 3. The intensity abbreviations vs, s, m, w, and vw represent "very strong," "strong," "medium," "weak," and "very weak." The intensity ratios corresponding to these abbreviations appear in Table 4. The uncertainty in the $2\theta$ values is about ±0.05°.

The barium-containing $\delta\text{-}Al_2O_3$ contains very little $\theta\text{-}Al_2O_3$ and can be made as an essentially phase-pure material. Typically, no barium-containing phases are observable in the diffraction pattern, although the alumina may coexist with $BaCO_3$ likely formed by reaction between the barium in the alumina and $CO_2$ in the air.

TABLE 2

| Barium-Containing and Delta Alumina X-ray Diffraction Reflections | | | | |
|---|---|---|---|---|
| | BaO-δ-Al₂O₃ | | δ-Al₂O₃ | |
| 2θ | d, Å | I/I₀ | d, Å | I/I₀ |
| 11.07 | 7.99 | 4.3 | 7.6 | 4 |
| 13.39 | 6.61 | 4.6 | 6.4 | 4 |
| 16.22 | 5.46 | 1.2 | 5.53 | 4 |
| 17.54 | 5.06 | 9.5 | 5.10 | 8 |
| 18.83 | 4.71 | 1.7 | | |
| 19.66 | 4.515 | 4.9 | 4.57 | 12 |
| 21.93 | 4.053 | 6.6 | 4.07 | 12 |
| 25.07 | 3.552 | 2.3 | 3.61 | 4 |
| 26.21 | 3.400 | 2.9 | | |
| 27.22 | 3.276 | 2.9 | | |
| 27.75 | 3.214 | 5.0 | 3.23 | 4 |
| 28.33 | 3.150 | 1.7 | | |
| 29.40 | 3.308 | 4.0 | 3.05 | 4 |
| 31.28 | 2.859 | 3.5 | | |
| 32.12 | 2.786 | 7.3 | 2.881 | 8 |
| 32.83 | 2.728 | 32.6 | 2.728 | 30 |
| 34.60 | 2.592 | 24.2 | 2.601 | 25 |
| 36.60 | 2.455 | 56.2 | 2.460 | 60 |
| | | | 2.402 | 16 |
| 39.00 | 2.309 | 24.5 | 2.315 | 8 |
| 39.52 | 2.280 | 30.3 | 2.279 | 40 |
| 41.86 | 2.158 | 4.9 | 2.160 | 4 |
| 44.93 | 2.017 | 10.1 | | |
| 45.64 | 1.988 | 89.0 | 1.986 | 75 |
| 46.58 | 1.950 | 13.8 | 1.953 | 40 |
| 47.67 | 1.908 | 3.7 | 1.914 | 12 |
| 49.66 | 1.836 | 0.9 | 1.827 | 4 |
| | | | 1.810 | 8 |
| 50.79 | 1.797 | 3.3 | | |
| 53.87 | 1.702 | 4.3 | | |

TABLE 2-continued

Barium-Containing and Delta Alumina X-ray Diffraction Reflections

| | BaO-δ-Al$_2$O$_3$ | | δ-Al$_2$O$_3$ | |
|---|---|---|---|---|
| 2θ | d, Å | I/I$_o$ | d, Å | I/I$_o$ |
| | | | 1.628 | 8 |
| 57.28 | 1.608 | 4.9 | 1.604 | 4 |
| 58.80 | 1.570 | 0.9 | | |
| 60.01 | 1.541 | 6.9 | 1.538 | 8 |
| 61.54 | 1.507 | 14.1 | 1.517 | 16 |
| 64.06 | 1.453 | 4.0 | 1.456 | 8 |
| 66.67 | 1.402 | 25.4 | 1.407 | 50 |
| 67.28 | 1.391 | 100.0 | 1.396 | 100 |

TABLE 3

Essential X-ray Diffractions Reflections

| 2θ | d, Å | I/I$_o$ |
|---|---|---|
| 17.49–17.59 | 5.02–5.10 | w |
| 21.88–21.98 | 4.041–4.065 | vw |
| 32.07–32.17 | 2.781–2.881 | vw |
| 32.78–32.88 | 2.723–2.733 | w-m |
| 34.55–34.65 | 2.587–2.597 | w-m |
| 36.55–36.65 | 2.450–2.460 | m-s |
| 38.95–39.05 | 2.304–2.314 | w-m |
| 39.47–39.57 | 2.277–2.283 | m |
| 41.81–41.91 | 2.155–2.161 | vw |
| 45.59–45.69 | 1.985–1.991 | s-vs |
| 46.53–46.63 | 1.947–1.953 | w-m |
| 57.23–57.33 | 1.606–1.610 | vw |
| 59.96–60.06 | 1.539–1.543 | vw |
| 61.49–61.59 | 1.506–1.508 | w |
| 67.23–67.33 | 1.391–1.393 | vs |

TABLE 4

Intensity Level Abbreviations

| I/I$_o$ | Abbreviation |
|---|---|
| 0–9 | vw |
| 10–24 | w |
| 25–59 | m |
| 60–84 | s |
| 85–100 | vs |

EXAMPLE V

Comparative Examples

In order to determine the essential components of the barium-containing alumina, aluminas were synthesized using components other than the combination of barium acetate and polyethylene glycol while using the same moderately crystalline boehmite sol, Vista Dispal 11N7-12.

An alumina was synthesized as in Example I using barium acetate but without using polyethylene glycol. After hydrothermal treatment at 1140° C., the alumina was not a pure delta alumina although it contained more delta alumina than theta alumina.

An alumina was synthesized as in Example I using polyethylene glycol (400 g/mol) but without using barium acetate. After hydrothermal treatment at 1140° C., the alumina was predominantly theta alumina. Delta alumina was a minor phase.

An alumina was synthesized as in Example I without using polyethylene glycol or barium acetate by just calcining the Vista boehmite sol. As in the alumina prepared using only polyethylene glycol, after hydrothermal treatment at 1140° C., the alumina was predominantly theta alumina, but also contained a small amount of alpha alumina.

Barium nitrate substituted for barium acetate in the Example I synthesis yielded an alumina containing substantial amounts of theta alumina. The same synthesis with the concomitant use of citric acid partially suppressed the formation of theta.

Calcium acetate and lanthanum acetate were also tried separately as replacements for barium acetate, but without success. Each provided a mixture of theta and delta alumina.

EXAMPLE VI

Alternative Syntheses of Barium-Containing Alumina. Barium-containing alumina was prepared as in Example I except that 1,4,7,10,13-pentaoxacyclopentadecane ("15-crown-5") was used in place of polyethylene glycol. Barium acetate (1.98 g) and 10.14 g 15-crown-5 were dissolved together in 13.05 g deionized water and added with stirring to a second beaker containing 250 mL Vista Dispal 11N7-12 boehmite sol (208 Å crystallites). A gel immediately formed. The gel was then dried on an evaporating dish in a drying oven at 120° C. then calcined for 6 hours at 1000° C. Subsequently, a fraction was treated in a tube furnace at 1140° C. for 6 hours in air with 10% steam and an nominal flow rate of 500 mL/min. An X-ray diffraction pattern was taken. The reflections in the diffraction pattern correspond well with the pattern in the FIGURE. There are additional reflections, however, indicating that there is also a small amount of BaCO$_3$ in the barium-containing alumina material.

In another experiment, sorbitol substituted for polyethylene glycol in the Example I synthesis. Hydrothermal treatment yielded an alumina containing substantial amounts of delta alumina, but reflections in the X-ray diffraction pattern also showed the presence of BaCO$_3$ and theta alumina.

Finally, two different preparations of barium-containing alumina were synthesized using polyethylene glycol and barium acetate by the procedure of Example I. Polyethylene glycol with molecular weights 300 g/mol and 600 g/mol, respectively, were used. X-ray diffraction patterns were taken for both samples. The reflections in both diffraction patterns corresponded well with the pattern of the FIGURE. No BaCO$_3$ was detected.

I claim:

1. A barium-containing alumina prepared by the process comprising the steps of:
   (a) making three preparations:
      (i) an aqueous solution of a water soluble barium carboxylate having a concentration suitable to provide about 2 wt. % to about 18 wt. % Ba in the alumina;
      (ii) a polyether or a polyalcohol; and
      (iii) an aqueous boehmite sol or suspension having crystallites greater than about 150 Å;
   (b) simultaneously adding preparations (a)(i) and (a)(ii) to preparation (a)(iii) with stirring to form a gel, said gel having a polyether or polyalcohol content of about 2 wt. % to about 26 wt. %;
   (c) drying the gel and then calcining said dried gel in air at a temperature greater than about 1000° C.; and
   (d) optionally further crystallizing the alumina by treating said calcined gel at a temperature in the range of from about 1000° C. to about 1350° C., in an atmosphere containing 3 to about 30% steam.

2. The barium-containing alumina of claim 1 wherein the water soluble barium carboxylate may be chosen from the group consisting of barium acetate and barium propionate.

3. The barium-containing alumina of claim 1 wherein the barium content ranges from about 8 wt. % to about 12 wt. %.

4. The alumina of claim 1 wherein a polyether is used and is chosen from the group consisting of a polyethylene glycol, diethylene glycol monobutyl ether, 1,4,7,10,13,16-hexaoxacyclooctadecane ("18-crown-6"), 1,4,7,10,13-pentaoxacyclopentadecane ("15-crown-5"), 1,4,7,10,13,16,19-heptaoxacycloheneicosane ("21-crown-7").

5. The barium-containing alumina of claim 4 wherein the polyether is a polyethylene glycol having a molecular weight in the range of from about 300 g/mol to about 600 g/mol.

6. The barium-containing alumina of claim 1 wherein a polyalcohol is used and is chosen from the group consisting of sorbitol and sucrose.

7. The barium-containing alumina of claim 1 wherein the aqueous boehmite sol has crystallites between about 175 Å and about 250 Å.

8. The barium-containing alumina of claim 1 wherein the gel of (c) is calcined at a temperature between about 1050° C. and about 1175° C.

9. The barium-containing alumina of claim 1 wherein the calcined gel product of (c) is further crystallized by treating said calcined gel at a temperature in the range of from about 1100° C. to about 1200° C. in an atmosphere containing about 10% steam.

10. The barium-containing alumina of claim 1 wherein said alumina is essentially delta alumina as measured by X-ray diffraction.

11. The barium-containing alumina of claim 1 wherein the gel formed in (b) has a polyether or polyalcohol content of about 10 wt. % to about 20 wt. %.

12. A barium-containing alumina comprising alumina and about 2 wt. % m about 18 wt. % barium and having a characteristic X-ray powder diffraction pattern which contains at least the following d-spacings and intensities:

| 2θ | d, Å | I/I₀ |
| --- | --- | --- |
| 17.49–17.59 | 5.02–5.10 | 10–24 |
| 21.89–21.99 | 4.041–4.065 | 0–9 |
| 32.07–32.17 | 2.781–2.881 | 0–9 |
| 32.79–32.88 | 2.723–2.733 | 10–59 |
| 34.55–34.65 | 2.597–2.597 | 10–59 |
| 36.55–36.65 | 2.450–2.460 | 25–84 |
| 38.95–39.05 | 2.304–2.314 | 10–59 |
| 39.47–39.57 | 2.277–2.283 | 25–59 |
| 41.81–41.91 | 2.155–2.161 | 0–9 |
| 45.59–45.69 | 1.995–1.991 | 60–100 |
| 46.53–46.63 | 1.947–1.953 | 10–59 |
| 57.23–57.33 | 1.606–1.610 | 0–9 |
| 59.96–60.06 | 1.539–1.543 | 0–9 |
| 61.49–61.59 | 1.506–1.509 | 10–24 |
| 67.23–67.33 | 1.391–1.393 | 85–100. |

13. The barium-containing alumina of claim 2 wherein the barium content ranges from about 8 wt. % to about 12 wt. %.

14. A barium-containing alumina comprising alumina and about 2 wt. % to about 18 wt. % barium, having a characteristic X-ray powder diffraction pattern which is stable to a temperature of about 1300° C. and which contains at least the following d-spacings and intensities:

| 2θ | d, Å | I/I₀ |
| --- | --- | --- |
| 17.49–17.59 | 5.02–5.10 | 10–24 |
| 21.89–21.98 | 4.041–4.065 | 0–9 |
| 32.07–32.17 | 2.791–2.881 | 0–9 |
| 32.78–32.99 | 2.723–2.733 | 10–59 |
| 34.55–34.65 | 2.597–2.597 | 10–59 |
| 36.55–36.65 | 2.450–2.460 | 25–84 |
| 38.95–39.05 | 2.304–2.314 | 10–59 |
| 39.47–39.57 | 2.277–2.283 | 25–59 |
| 41.81–41.91 | 2.155–2.161 | 0–9 |
| 45.59–45.69 | 1.985–1.991 | 60–100 |
| 46.53–46.63 | 1.947–1.953 | 10–59 |
| 57.23–57.33 | 1.606–1.610 | 0–9 |
| 59.96–60.06 | 1.539–1.543 | 0–9 |
| 61.49–61.59 | 1.506–1.508 | 10–24 |
| 67.23–67.33 | 1.391–1.393 | 85–100. |

15. The barium-containing alumina of claim 14 wherein the barium content ranges from about 8 wt. % to about 12 wt. %.

* * * * *